Jan. 21, 1936.  G. H. LENKE  2,028,615
GLAZING STRUCTURE
Filed Jan. 8, 1934   2 Sheets-Sheet 1
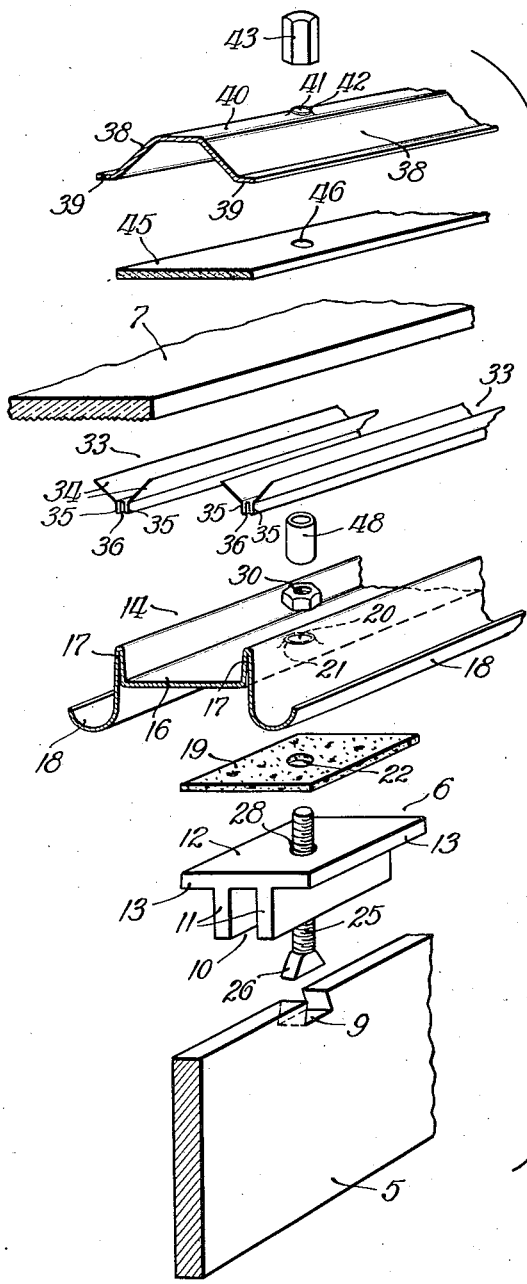
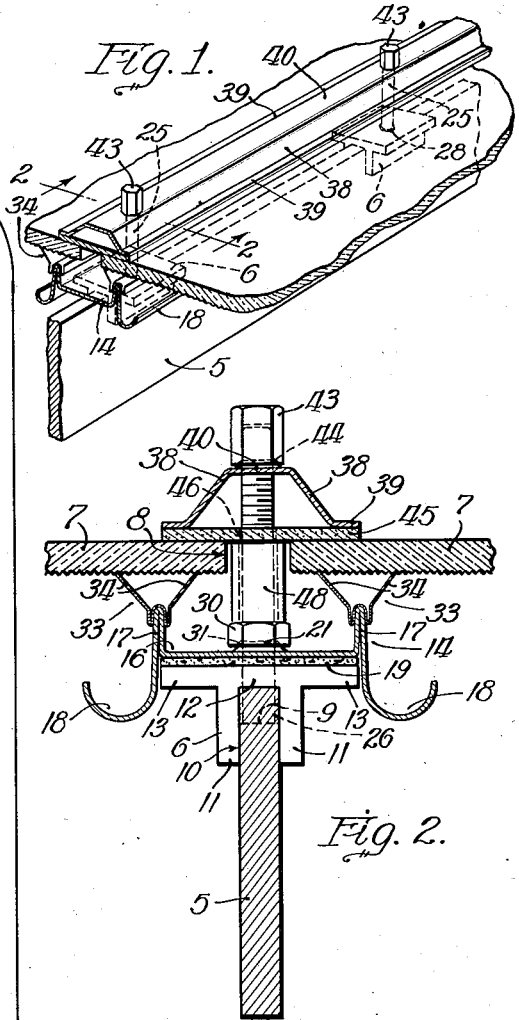
Inventor:
George H. Lenke
By: Brown, Jackson, Boettcher + Dienner
Attys.

Jan. 21, 1936. G. H. LENKE 2,028,615
GLAZING STRUCTURE
Filed Jan. 8, 1934  2 Sheets-Sheet 2
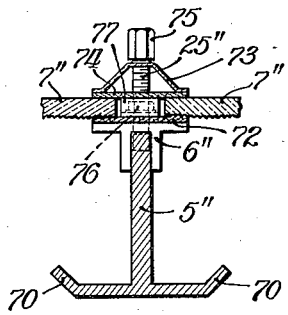
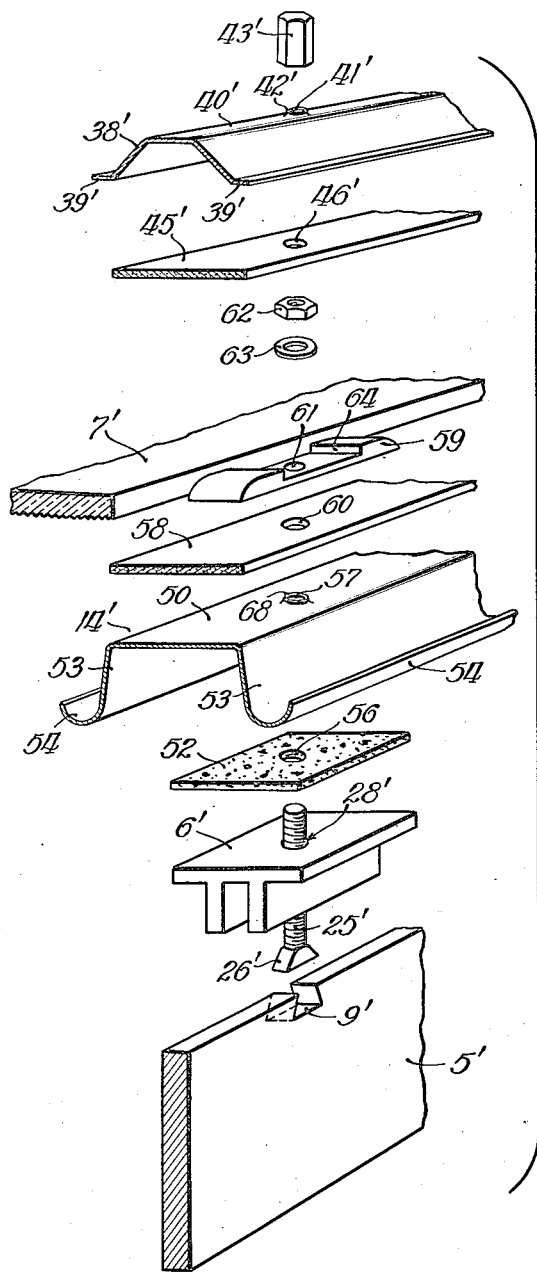
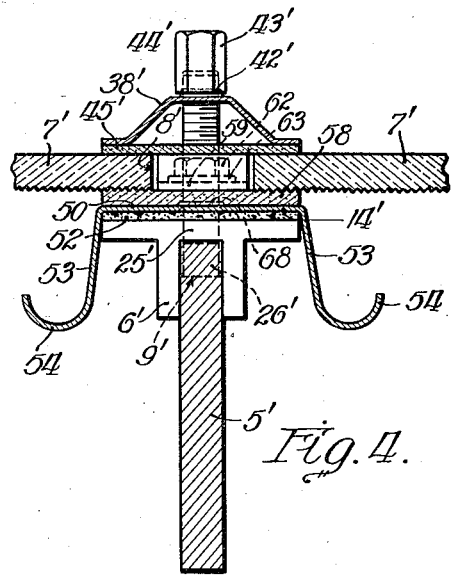
Inventor:
George H. Lenke
By Brown, Jackson, Boettcher & Dienner
Attys.

Patented Jan. 21, 1936

2,028,615

UNITED STATES PATENT OFFICE 2,028,615

GLAZING STRUCTURE

George H. Lenke, Elmhurst, Ill., assignor of one-half to Julius J. Ohlis, Oak Park, Ill.

Application January 8, 1934, Serial No. 705,750

8 Claims. (Cl. 108—16)

This invention relates to improvements in glazing structures and the like, and one of its objects is the provision of a generally improved, simplified and inexpensive structure in which crating, shipment and erection are simplified, and more especially a structure in which the rafter or supporting bars may be made up, crated and shipped in flat form, and the parts assembled on the job without welding or riveting.

Another object is the provision of an improved lug member and an improved mounting of this lug member upon and attachment to the rafter or supporting bar by means of which the top of the lug member fits down upon the top of the rafter or supporting bar to stiffen the structure laterally, and which facilitates erection and securement of the lug member to the rafter bar.

Another object is the provision of a structure having a lug member mounted upon the rafter or supporting bar, and a stud secured not to the lug member but to the rafter bar and extending upwardly through a cap member and engaged in a suitable nut for securing the glass members and other parts in assembled relation and the lug member in assembled position upon the bar.

Another object is the provision of an improved gutter member of unitary form with upright folds for supporting the glass seating members, the folds mounting these glass seating members and presenting the requisite stiffness along said mountings.

Another object is to prevent moisture from seeping down below the came mounting and gutter member, and particularly through the opening or openings provided in this member for the stud or studs which secure the glass members and the parts in assembled relation.

The present invention has particular utility in connection with skylight structures, and I shall illustrate and describe the same in connection with such a structure, but it is to be understood that the invention is not limited to use in connection with such structures but may be employed in all similar structures as suitable and desired.

Further objects and advantages and the details of the illustrated embodiments of the invention will appear from the following detailed description taken in connection with the accompanying drawings, in which:

Figure 1 is a broken perspective view of a glazing structure embodying the present invention;

Figure 2 is a vertical section taken on the line 2—2 of Figure 1;

Figure 3 is a fragmentary perspective view showing in superposed relation the parts of the glazing structure of Figures 1 and 2 prior to assembly of said parts;

Figure 4 is a vertical section, similar to Figure 1, showing another form of glazing structure embodying the present invention;

Figure 5 is an exploded perspective view similar to Figure 3, and showing the parts of the glazing structure of Figure 4 in superposed relation and prior to assembly; and Figure 6 is a vertical section, similar to Figures 2 and 4, showing another structure embodying the present invention.

While the drawings illustrate parts only of the skylight units in which the invention is embodied, it is to be understood that there may be many of these units, each having its rafter bar or bars provided at spaced locations with the lug members, and that the sectional structures shown in the drawings may be duplicated many times throughout the length of each rafter bar.

Referring first to the embodiment of Figures 1, 2 and 3, the glazing structure illustrated therein comprises a plain supporting or rafter bar 5, upon the top of which the lug members 6 are mounted at spaced locations, and the glass members or panes 7, 7 supported on the lug members 6 and spaced apart at 8.

The bar 5 constitutes the support for the glazing structure and may be secured to the roof or part of the building upon which the glazing structure is erected. It is of plain or flat form and may be made up, crated, and shipped in that form, the parts being adapted to be assembled on the job and secured in assembled position without welding or riveting of the lug members 6 to the bar 5, as will hereinafter appear. The bar 5 is provided along the top thereof with upwardly and laterally opening sockets 9 at spaced locations along the top of the bar, and preferably of dove-tail form and widening downwardly as shown.

The lug members 6 may be of cast iron, malleable iron, copper, aluminum, or other suitable or preferred material, and each is forked downwardly, or provided with a downwardly opening channel 10 for receiving the top of the bar 5 with legs 11 depending down along the opposite sides of the channel and fitting or embracing the sides of the bar 5. The closed top 12 of each lug 6 fits down upon the top of the bar 5, which brings the structure down upon the bar member without upward spacing. This avoids top-heaviness and provides great lateral strength. The sides of the top 12 extend out laterally of the legs 11 in the form of top flanges 13, 13.

The gutter member 14, which is preferably of sheet metal, such as galvanized iron, copper, aluminum, or other suitable or preferred material, is mounted upon the lug members 6. This gutter member 14 is elongated or continuous from end to end, and the formation of the lugs 6 in short lengths mounted at spaced locations along the bar 5 permits circulation of air from one side of the bar 5 to the opposite side through the spaces between the lugs 6 and between the top of the bar 5 and the bottom of the gutter 14. It is to be understood, however, that the lug members may, within the scope of the present invention, be elongated or continuous from end to end instead of in the form of separate spaced lugs as illustrated in the drawings.

The gutter member 14 has a intermediate upwardly opening channel portion 16 with upright folds 17 forming the opposite sides of this channel, and gutters 18 flanking these folds. The flanking gutters 18 are formed by extending the outer sides of the folds 17 downwardly along the sides of the flanges 13 and rounding the bottom margins of these depending sides upwardly, as shown. A gasket strip 19, preferably of cork, although it may be of other suitable material, is interposed between the lugs 6 and the gutter 14, and the bottom of the channel portion 16 of the gutter member has openings 20, each of which is surrunded by an upstanding annular lip 21. Where the lugs members 6 are relatively short and mounted at spaced locations, the gasket 19 may be in the form of separate gaskets, each of a length corresponding with the length of the lug member and each provided with an opening 22 for registration with the openings 20 in the gutter member, but where the lug member is of extended or continuous form from end to end the gasket may be of extended or continuous form with the openings 22 at spaced locations for registration with the openings in the gutter member.

The studs 25 are provided with heads 26 shaped in conformity with the sockets 9 and engageable laterally in these sockets. The engagement of the stud heads 26 in the sockets 9 secures these studs to the bar 5 beneath the lug member, and the shanks of the studs extend upwardly through openings 28 in the lugs 6 and through the openings 22 and 20 in the gasket 19 and gutter member 14.

Nut members 30 are threaded upon the studs 25 down against the bottom of the gutter member 14 to clamp the gutter with the interposed gasket 19 firmly upon the lugs 6, and to secure the lugs 6 in position upon the top of the bar 5. These nut members 30 are recessed at 31 to receive and cooperate with the lips 21 for the purpose of effecting moisture-tight joints between the studs 25 and the gutter member 14.

In assembling the structure the heads 26 of the studs 25 are inserted laterally into the sockets 9, whereupon the lugs 6 are inserted over the shanks of the studs 25 and down into position upon the top of the bar 5. The gaskets 19 and gutter 14 are then passed over the upstanding shanks of the studs 25 and positioned down upon the lugs 6, whereupon the nut members 30 are threaded upon the studs and down against the upstanding lips 21 of the gutter member to secure these parts in assembled relation. The lugs 6 are thereby secured in place by the upstanding studs which mount the glazing structure upon the lugs, and this securement of the studs to the bar 5 is obtained without welding or riveting operations. In assembled position, the legs 11 of the lugs 6 extend down along and embrace the sides of the bar 5 along the sockets 9, the lugs 6 preventing lateral displacement of the studs from the sockets 9, and the depending legs 11 of these lugs covering the opposite sides of these sockets.

The glass pane seating members are in the form of relatively thin metal strips, preferably of relatively soft metal, such as copper or zinc. Each strip has a pair of integral and outwardly flared wings 34, the upper edges of which bear against and seat the glass panes 7. The body portion of each strip 33 has a double fold 35 disposed between the wings 34 and forming a groove 36, which groove 36 receives the adjacent upper margin of the side fold 17 of the gutter member 14 for the purpose of mounting the strip 33 upon the sides of the intermediate channel portion of the gutter member. The top of the groove 36 is closed by the doubling over from one fold 35 to the other fold 35, and the fold or side flange 17 of the gutter 14 preferably enters up to and seats against the closed top of the groove 36. The double fold 35 and downwardly opening groove 36 enables the strips 33 to be supported upon the upright sides of the gutter 14 and eliminates the necessity of forming channel seats along the opposite sides of the gutter or supporting structure. This reduces the amount of metal required in the gutter or supporting structure and materially simplifies the construction and assembly. Obviously, the wings 34 have substantially line contact with the bottom surfaces of the glass panes or panels, and this line contact, together with the construction of the strip 33, permits the wings 34 to conform to irregularities in the surface of the glass and to provide a substantially waterproof and moisture-proof contact therewith at all times. At the same time, the yieldability of the strip 33 allows the relative movement which accompanies expansion and contraction without breaking the glass panes or panels. Also, as the seating strips are forced into engagement with the panes or panels the folds along each of the opposite sides of the mounting flanges 17 give a greater freedom of action to the wings 34, and these folds have the additional function of excluding moisture from entering between the flanges 17 and the groove 36, thereby preventing rusting between these parts.

The shanks of the studs 25 extend upwardly between the glass members 7, and a longitudinally elongated or continuous cap member is mounted upon the studs 25 above the glass panes 7. This glazing cap, illustrated at 38, may be formed of the same material as the gutter member, or of any other suitable or preferred material, and is of generally channel form opening downwardly and with relatively narrow flanges 39 at the lower margins of its downwardly spreading sides. The top 40 of this glazing cap 38 has openings 41 through which the studs 25 extend, and these openings are preferably surrounded by upstanding annular lips 42. Nut members 43 are threaded upon the upper ends of the studs 25 and down against the cap 38 to clamp the glass panes in place and to seal the parts against water or moisture seepage. The bottom of each nut 43 is recessed at 44 to receive and engage over the upstanding lips 42 to provide moisture-tight joints between the stud 25 and the cap member 38.

A sealing strip of felt or other suitable material is interposed between the flanges 39, 39 of the cap 38 and the glass panes 7 to seal the structure against water and moisture seepage. This sealing strip 45 is elongated or continuous from end to end to extend throughout the length of the cap 38, and is provided with openings 46 through which the studs 25 extend. And mounted upon the studs 25, lengthwise between the sealing strip 45 and the nut 30 and sidewise between the glass panes 7, is a metal or fiber glass spacing sleeve 48. One of these sleeves 48 is positioned upon each of the studs 25, and the upper ends of these sleeves fit between the glass panes 7 to space the same, and preferably with clearance between the sides of the sleeves and the margins of the panes to allow for expansion and contraction.

The glazing structure illustrated in Figures 4 and 5 comprises a plain supporting or rafter bar 5' upon the top of which the lug members 6', corresponding with the lug members of the previous embodiment, are mounted at spaced locations in the manner of the preceding embodiment, and the glass members or panes 7', 7' are supported on the lug members 6' and spaced apart at 8'.

As before, the bar 5' constitutes the support for the glazing structure and may be secured to the roof or part of the building upon which the glazing structure is erected. Like the bar of the preceding embodiment, it is of plain or flat form and may be made up, crated and shipped in that form, the parts being adapted to be assembled on the job without welding or riveting of the lug members 6' to the bar 5'. As before, the bar 5' is provided along the top thereof with upwardly and laterally opening sockets 9' at spaced locations along the top of the bar, and preferably of dove-tail form, widening downwardly as shown. The closed top of the lugs 6' fit down upon the top of the bar 5' which brings the structure down upon the top of the bar without upward spacing and with great lateral strength.

The gutter member 14', which may be of the same material as the gutter member of the preceding embodiment, is mounted upon the lug members 6'. This gutter member 14', instead of having an intermediate channel portion as in the preceding embodiment, has a flat intermediate portion 60 of substantially the width of the top of the lugs 6', and resting upon these lugs with a gasket 52 of cork or other suitable material interposed between it and the tops of the lugs 6'. At opposite sides of the intermediate portion 50 the gutter is turned down at 53, and the lower margins of these downturned portions 53 are rounded upwardly at 54 to provide gutters flanking opposite sides of the top of the bar 5'.

The studs 25' are provided with heads 26' shaped in conformity with the sockets 9' and engageable laterally in these sockets. The engagement of the stud heads 26' in the sockets 9' secures these studs to the bar 5' beneath the lug members 6', and the shanks of the studs extend upwardly through openings 28' in the lugs 6' and through openings 56 and 57 in the gasket 52 and gutter member 14'.

Resting upon the gutter 14' is a cushion 58 of felt or other suitable material which constitutes a cushioning member for the glass panes 7', 7' resting directly thereon. Bearing upon the cushion member 58 in the space between the panes 7', 7' is a glass spacer, preferably of rubber, although it may be of other suitable material. The studs 25' extend upwardly through openings 60 and 61 in the cushion member 58 and spacer 59, respectively, and nuts 62 are threaded upon the studs 25' down against the spacers 59 to clamp the spacers 59, cushion 58 and gutter member 14' with the interposed gasket 52, firmly upon the lugs 6' and to secure the lugs 6' in position upon the top of the bar 5'. Washers 63 are preferably interposed between the nuts 62 and the spacers 59, and these spacers are preferably recessed at 64 to position the nut members 62 down within the space between the panes 7', 7' and with their upper ends substantially at or below the top surfaces of these panes. This recessing of the spacers enables requisite thickness in the ends of these spacers for spacing the panes and, at the same time, permits positioning the nut members down within the space between the panes as described. The spacers 59 fit between the panes, preferably with clearance between the opposite sides of the spacers and the respective panes for the purpose of allowing for expansion and contraction.

The studs 25' extend upwardly between the panes 7', and a glazing cap 38', corresponding with the glazing cap of the previous embodiment, is mounted upon the studs 25' above the panes 7'. This glazing cap has the relatively narrow flanges 39' at the lower margins of its downwardly spreading sides, and the top 40' has openings 41' through which the studs extend. Nut members 43' are threaded upon the upper ends of the studs 25' and down against the cap 38' to clamp the glass panes in place and to seal the parts against water or moisture seepage. The openings 41' are preferably surrounded by upstanding annular lips 42', and the bottom of each nut 43' is recessed at 44' to receive and engage over the upstanding lips 42' to provide water and moisturetight joints between the stud 25' and the cap 38'.

A sealing strip of felt or other suitable material is interposed between the flanges 39' of the cap 38' and the glass panes 7' to seal the structure against water and moisture seepage. This strip 45' is similar to the cap sealing strip of the previous embodiment, and is provided with openings 46' through which the stud 25' extends. The openings 57 in the gutter 14' are likewise preferably surrounded by upstanding annular lips 68 which interlock with the asphaltic felt glass cushion 58 and prevent possible water or moisture seepage down along the studs.

In the embodiment illustrated in Figure 6, the supporting or rafter bar 5'' is plain or flat at the top, as in the preceding embodiment, but at the bottom is provided with integral gutter portions 70 flanking the opposite sides of the lower margin of the bar. In this embodiment, the glass panes 7'' are mounted directly upon the lugs 6'' without extra gutter members, glass cushions 72 of asphaltic felt or other suitable material being interposed between the bottom surfaces of the panes 7'' and the tops of the lugs 6''. The glazing cap 73, studs 25'', sealing strip 74 and nuts 75 are similar to corresponding parts of the preceding embodiment, as are the nuts 76 and glass spacers 77.

I do not intend to be limited to the precise details shown or described.

I claim:

1. In a glazing structure, a supporting bar having an upwardly and laterally opening socket in its upper edge and flat throughout its vertical dimension, a pane supporting lug member seated directly upon the top of the bar and having a bifurcation for receiving the top of the bar, said pane supporting lug member having legs embracing the lateral sides of the bar and pane supporting portions extending substantially beyond said lateral sides of the bar, a stud having a head engageable in said socket and a shank passing upwardly through said lug member, glazing parts supported by said lug member and including panes substantially overlapping the pane supporting portions of said lug member and supported thereon, and means on said stud for securing the glazing parts in assembled relation upon the lug member and the lug member in assembled position upon the supporting bar.

2. In a glazing structure, a supporting bar disposed with its sides in a vertical plane and flat throughout its vertical dimension, a pane supporting lug member seated directly upon the top of the bar and having a bifurcation for receiving the top of the bar, said pane supporting lug member having legs embracing the lateral sides of the bar, and pane supporting portions extending substantially beyond said lateral sides of the bar, a stud secured in the top of the bar and passing upwardly through said lug member, glazing parts supported by said lug member and including panes substantially overlapping the pane supporting portions of the lug member and supported thereon, and means on said stud for securing the glazing parts in assembled relation upon the lug member and the lug member in assembled position upon the supporting bar.

3. In a glazing structure, a rafter bar, a lug member fitted upon said bar, a gutter member mounted upon said lug member and having an intermediate channel portion with folds forming the opposite sides of said channel portion and gutter portions flanking said folds, pane seating members comprising relatively thin strips of metal having folds forming downwardly opening grooves for receiving the folds in said gutter member and mounting said pane seating members thereon, said pane seating members having upwardly extending and outwardly diverging side wings, glass panes seated upon the wings of said pane seating members and spaced apart, an insulating member interposed between the gutter member and the lug member, a stud secured to said rafter bar and extending upwardly through the lug and gutter members and also through said insulating member and between said glass panes, a cap member mounted on said stud, a sealing member between said cap member and said glass panes, and means on said stud and cooperating with said cap member for securing the glazing structure in assembled position upon the lug member.

4. In a glazing structure, a rafter bar, a lug member fitted upon said bar, a gutter member mounted upon said lug member and having an intermediate channel portion with folds forming the opposite sides of said channel portion and gutter portions flanking said folds, pane seating members comprising relatively thin strips of metal having folds forming downwardly opening grooves for receiving the folds in said gutter member and mounting said pane seating members thereon, said pane seating members having upwardly extending and outwardly diverging side wings, glass panes seated upon the wings of said pane seating members and spaced apart, an insulating member interposed between the gutter member and the lug member, a stud secured to said rafter bar and extending upwardly through the lug and gutter members and also through said insulating member and between said glass panes, a cap member mounted on said stud, a sealing member between said cap member and said glass panes, means on said stud and cooperating with said cap member for securing the glazing structure in assembled position upon the lug member, and means located between the glass panes for spacing said panes and effecting a moisture-tight joint between the gutter member and said stud.

5. In combination a gutter member for glazing structures, said gutter member having an intermediate channel portion with folds forming the opposite sides of said channel portion, integral gutter portions flanking said folds, and glass seating members having downwardly directed channels seated over the folds of said gutter member.

6. In a glazing structure, a rafter bar, a lug member having a downwardly opening channel for receiving the top of said bar and mounting the lug member thereon, said lug member having depending legs fitting the sides of the bar on opposite sides of the channel and top flanges extending outwardly from the opposite sides of said legs, a gutter member mounted on said lug and having an intermediate channel portion with folds forming the opposite sides of said channel portion, integral gutter portions flanking said folds and extending down along opposite sides of the top flanges of said lug member, and glass seating members having downwardly directed channels seated over the folds of said gutter member.

7. In a glazing structure, a supporting bar having an upwardly and laterally opening socket in its upper edge and flat throughout its vertical dimension, a pane supporting lug member seated directly upon the top of the bar and having a bifurcation for receiving the top of the bar said pane supporting lug member having legs embracing the lateral sides of the bar, and pane supporting portions extending substantially beyond said lateral sides of the bar, a stud having a head engageable in said socket and a shank passing upwardly through said lug member, a gutter member supported on the pane supporting portions of said lug member, pane seating members carried by said gutter member, panes supported by said pane seating members and substantially overlapping the pane supporting portions of said lug member, and means on said stud for securing the glazing parts in assembled relation upon the lug member and the lug member in assembled position upon the supporting bar.

8. In a glazing structure, a supporting bar disposed with its sides in a vertical plane and flat throughout its vertical dimension, a main pane supporting lug member seated directly upon the top of the bar and having a bifurcation for receiving the top of the bar, said pane supporting lug member having legs embracing the lateral sides of the bar, and pane supporting portions extending substantially beyond said lateral sides of the bar, a stud secured in the top of the bar and passing upwardly through said lug member, a gutter member supported on the pane supporting portions of said lug, pane seating members carried by said gutter member, panes supported by said pane seating members and substantially overlapping the pane supporting portions of said lug members, and means on said stud for securing the glazing parts in assembled relation upon the lug member and the lug member in assembled position upon the supporting bar.

GEORGE H. LENKE.